United States Patent
Hedhli et al.

(10) Patent No.: US 6,680,357 B1
(45) Date of Patent: Jan. 20, 2004

(54) CROSSLINKABLE AQUEOUS FLUOROPOLYMER BASED DISPERSIONS

(75) Inventors: Lotfi Hedhli, King of Prussia, PA (US); Larry Wempe, Center Valley, PA (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 161 days.

(21) Appl. No.: 09/613,515

(22) Filed: Jul. 10, 2000

Related U.S. Application Data

(60) Provisional application No. 60/143,663, filed on Jul. 14, 1999.

(51) Int. Cl.[7] .............................................. C08L 15/02
(52) U.S. Cl. .................... 525/326.2; 524/544; 524/545; 524/546; 524/458; 526/254; 526/255; 525/276
(58) Field of Search ................................ 526/254, 255; 525/276, 326.2; 524/545, 546, 544, 458

(56) References Cited

U.S. PATENT DOCUMENTS

| | | | | |
|---|---|---|---|---|
| 5,349,003 A | * | 9/1994 | Kato et al. ................... | 524/458 |
| 5,447,982 A | * | 9/1995 | Kamba et al. ............... | 524/458 |
| 5,646,201 A | * | 7/1997 | Araki et al. ................. | 523/201 |
| 5,859,112 A | * | 1/1999 | Overbeek et al. ........... | 524/460 |
| 5,859,144 A | * | 1/1999 | Saito et al. ............... | 525/326.2 |
| 6,326,437 B1 | * | 12/2001 | Tsuda et al. ................. | 524/545 |

FOREIGN PATENT DOCUMENTS

| | | |
|---|---|---|
| EP | 0 360 575 A | 3/1990 |
| EP | 0 748 826 A | 12/1996 |
| EP | 0 765 890 A | 4/1997 |
| JP | 7-268163 | * 10/1995 |
| JP | Hei. 7-268163 | 10/1995 |
| JP | 8 170045 | 8/1996 |
| JP | 8 259773 | 8/1996 |
| JP | Hei. 8-337754 | 12/1996 |
| JP | 9 165490 | 9/1997 |
| WO | WO 96/06887 A1 | 3/1996 |

OTHER PUBLICATIONS

English translation of Japanese Patent Publication No. Toku–Kai–Hei 7–268163.*

* cited by examiner

*Primary Examiner*—David W. Wu
*Assistant Examiner*—Henry S Hu
(74) *Attorney, Agent, or Firm*—William D. Mitchell

(57) ABSTRACT

Acrylic Modified Fluoropolymers based on vinylidene fluoride polymers are disclosed wherein the acrylic phase is capable of entering into crosslinking reactions. The final cured products provide superior solvent extractability resistance to the fluoropolymer phase.

15 Claims, No Drawings

CROSSLINKABLE AQUEOUS FLUOROPOLYMER BASED DISPERSIONS

This application claims priority from U.S. provisional application serial No. 60/143,663 filed Jul. 14, 1999.

BACKGROUND OF THE INVENTION

This invention relates to fluoropolymers, more specifically to fluoropolymers based on vinylidene fluoride (VDF), still more specifically to polymers based on polyvinylidene fluoride (PVDF), still more specifically to PVDF homopolymers and to PVDF-based polymers having incorporated therein residues derived from monomers capable of copolymerization with VDF, particularly residues derived from hexafluoropropylene (HFP) or PVDF/HFP copolymers, still more particularly to polymers where PVDF-based polymer particles, particularly, PVDF homopolymer and/or PVDF/HFP copolymer particles, are employed as seed in a polymerization of acrylic-type polymers from acrylic-type monomers and monomers copolymerizable with acrylic-type monomers to form what will be referred to herein as "AMF polymers," still more specifically to AMF polymers containing in the acrylic portion thereof functional groups capable of reacting with other functional groups in the acrylic portions of other AMF polymers with or without the aid of separate crosslinking aids to form crosslinked AMF polymers, to processes for the preparation and use of such polymers, to compositions containing the uncrosslinked polymers and compositions and articles of manufacture which comprise the crosslinked polymers.

DISCLOSURE OF PRIOR ART

Commercially successful vehicles for paints, films, and the like to form coatings for substrates based on VDF homo- and copolymers for many years were based on the inclusion of a portion of acrylic polymers to aid inter alia in adhesion of the coating to the substrate and wetting and binding of the pigment.

The VDF polymer or copolymer and the acrylic polymer were prepared separately and simply blended by known techniques with the pigment and any other desired ingredients to form the composition used to form the coating.

In recent years, attempts have been made to prepare AMF polymers because of various advantages thought to be embodied in that approach to PVDF homopolymer and copolymer based coatings.

Also, thermosetting acrylics are well known in the literature for increasing physical and mechanical properties as well as solvent and mar resistance for the acrylic polymer over corresponding non-thermosetting acrylics. Thermosetting can be achieved by many means, such as, Diels Alder additions, auto-oxidation, free radical coupling, condensation and transesterification. Phase separation of incompatible polymers can also be reduced through internal crosslinks.

U.S. Pat. No. 5,349,003 discloses aqueous dispersions of vinylidene fluoride based polymers employed as seeds in acrylic polymer synthesis to prepare aqueous dispersions of AMF polymers.

The PVDF polymers may be homopolymers or copolymers of VDF with other fluorine containing ethylenically unsaturated compounds, such as trifluorochloroethylene (CTFE), tetrafluoroethylene (TFE), HFP, vinyl fluoride (VF), hexafluoroisobutylene perfluoroacrylic acid, or with fluorine free ethylenically unsaturated compounds, such as cyclohexylvinyl ether, hydroxyethylvinyl ether, or a fluorine free diene compound, such as butadiene, isoprene and chloroprene. Preferred are VDF homopolymer, VDF/TFE copolymer and VDF/TFE/HFP copolymer.

A large number of acrylic type monomers and monomers copolymerizable with acrylic type monomers are taught for polymerization in the presence of the fluoropolymer seed. Included in the list of possible monomers are a number with functional groups capable of forming crosslinks with like groups in other polymeric molecules by reaction with groups they are capable of reacting with on other polymeric molecules or with monomeric crosslinking agents. No such materials were actually prepared. No differences in properties for these crosslinkable AMF molecules were suggested from the materials actually prepared, and there is no indication that selection of and inclusion of acrylic monomers containing crosslinkable functional groups in AMF preparation will provide AMF polymers having the superior applied use properties discovered by applicants.

Japanese Patent Application, publication number 4 [1992]-325509 discloses AMF polymers containing carboxyl functionality in the acrylic portion to provide improved aqueous dispersability in alkaline solutions. The fluoropolymer seed can be poly(vinylidene-fluoride) homo- or copolymers. None of the advantageous applied use properties found by the present inventors for crosslinked AMF polymers are suggested.

U.S. Pat. No. 5,646,201 teaches AMF polymers based on copolymers of vinylidene fluoride and chlorotrifluoroethylene for use in aqueous dispersion paints. A third comonomer may be present in the VDF based copolymer. CTFE must be present to obtain the gloss and flexibility claimed for the paint coatings. The acrylic phase may contain monomer residues bearing functional groups capable of crosslinking. No such AMF polymers were actually made, and the advantages found by the present applicants for crosslinked AMF compositions are not taught or suggested.

Japanese Published Patent Application HEI 8 [1996]-170045 discloses an aqueous coating material for inorganic building materials based on AMF polymers wherein the fluoropolymer seed may be based on a vinylidene fluoride-hexafluoropropylene copolymer and the acrylic phase may include monomers having functional groups capable of being crosslinked. No crosslinkable AMF polymers were actually made and the advantages found by the present inventors for crosslinked coatings were not suggested.

Japanese Published Patent Application HEI 8 [1996]-259773 is similar to this last reference, but requires the incorporation of monomers having cyclohexyl groups in the acrylic phase for a enhancement of adhesion of the coating films. Once again, no crosslinking of the acrylic phase is taught or suggested and there is no hint of the unique properties of the crosslinked films found by applicants.

Japanese Published Patent Application HEI 9 [1997] 165490 discloses crosslinked AMF based coatings wherein crosslinking is by reaction of polyfunctional hydrazines and reactive carbonyl groups in the acrylic phase. The disclosure clearly discloses that chlorotrifluoroethylene and vinylidene fluoride must be the predominant monomers in the fluoropolymer phase, and the only actual examples made are of that type of AMF polymer. The advantages found by applicants for their claimed compositions are not suggested.

International Patent Application WO 96/06887A1 discloses stable aqueous dispersions of vinylidene fluoride monomer and a reactive emulsifier and AMF polymers based on such vinylidene fluoride copolymers as seed.

The aqueous dispersions of both types of polymer are stated to be very stable. Crosslinking of coatings from either polymer type is not discussed and the properties found by applicants for such crosslinked coatings are not suggested.

SUMMARY OF THE INVENTION

The invention provides in a first composition aspect, an acrylic modified fluoropolymer based on a vinylidene fluoride polymer selected from the group vinylidene fluoride homopolymer and vinylidene fluoride-hexafluoropropylene copolymer wherein the acrylic portion of the polymer contains monomer residues having functional groups capable of entering into reactions whereby the acrylic portion becomes crosslinked with the proviso that the functional groups do not include solely carboxylic acid groups.

The tangible embodiments of the first composition aspect of the invention are white or light colored solids having physical and chemical characteristics tending to confirm the molecular structure assigned herein.

The aforementioned chemical and physical characteristics taken together with the method of synthesis and standard analytical technique measurements, such as dynamic mechanical analytical, infrared and nuclear magnetic resonance spectroscopic and differential scanning calorimetric measurements, further positively confirm the aforesaid structure for the first composition aspect of the invention.

The tangible embodiments of the first composition aspect of the invention possess the inherent applied use characteristic of being suitable for inclusion in paint and varnish vehicles, either solvent or aqueous based, as pigment binders in powder coating formulations for the formation of crosslinked coatings and films of excellent gloss and durability to weathering, solvents, abrasion and the like. The crosslinked coatings not only resist solvent attack on the acrylic phase but, surprisingly, resist solvent attack on the fluoropolymer phase.

The invention provides in a second composition aspect, a curable composition comprising an acrylic modified fluoropolymer based on polyvinylidene fluoride polymer selected from the group consisting of polyvinylidene fluoride homopolymer and polyvinylidene fluoride-hexafluoropropylene copolymers wherein the acrylic phase contains monomer residues having functional groups capable of entering into reactions whereby the acrylic phase becomes crosslinked and at least one crosslinking catalyst with the proviso that the functional groups on the acrylic residue do not consist solely of carboxylic acid groups.

The tangible embodiments of the second composition aspect of the invention possess the inherent applied use properties of forming cured films and coatings showing enhanced resistance of the fluoropolymer phase to extraction by solvents, thereby providing enhanced weatherability, abrasion resistance, and chemical resistance in use.

The invention provides in a third composition aspect, a cured composition resulting from a curable composition comprising an acrylic modified fluoropolymer based on a polyvinylidene fluoride polymer selected from the group polyvinylidene fluoride homopolymer and polyvinylidene fluoride-hexafluoropropylene copolymer wherein the acrylic phase contains monomer residues having functional groups whereby the acrylic phase can become crosslinked, entering into a crosslinking reaction.

The tangible embodiments of the third composition aspect of the invention possess the inherent physical properties of being hard, glossy and abrasion resistant. They also possess excellent weather and solvent resistance and the fluoropolymer portion of the third composition aspect of the invention is highly resistant to extraction by solvents known to extract the fluoropolymer residue from acrylic modified fluoropolymer coatings, films and the like when the acrylic portion is not crosslinked.

The tangible embodiments of the third composition aspect, thus, possess the inherent applied use characteristic of forming coatings and films having gloss, hardness, abrasion resistance, weather resistance and excellent solvent resistance.

The invention provides in a fourth composition aspect, a three-dimensional object having, on at least one surface thereof, a coating comprising the third composition aspect of the invention.

The invention provides in a fifth composition aspect, an acrylic modified fluoropolymer based on a vinylidene fluoride copolymer selected from the group consisting of copolymers of vinylidene fluoride with chlorotrifluoroethylene, vinyl fluoride, tetrafluoroethylene and mixtures of any two or more of chlorotrifluoroethylene, vinyl fluoride and tetrafluoroethylene with the proviso that in any copolymer of vinylidene fluoride with chlorotrifluoroethylene, vinyl fluoride and/or tetrafluoroethylene, hexafluoropropylene may also be included as a comomomer and wherein the acrylic portion of the polymer contains monomer residues having functional groups capable of entering into reactions whereby the acrylic portion becomes crosslinked with the further proviso that the functional groups do not include solely carboxylic acid groups.

The tangible embodiments of the fifth composition aspect of the invention possess the same inherent physical and applied use properties as the tangible embodiments of the first composition aspect of the invention while providing the same unexpected result with respect to solvent attack on the fluoropolymer phase.

DESCRIPTION OF THE PREFERRED EMBODIMENTS

The manner of making and using the embodiments of the invention will now be illustrated with reference to a specific embodiment thereof, namely an acrylic modified fluoropolymer prepared by using vinylidene fluoride-hexafluoropropylene copolymer seed having 85.8 weight percent vinylidene fluoride content and 14.2 weight percent hexafluoropropylene content and a melt viscosity at 232° C., 100 s$^{-1}$ of 23 kp (ASTM D 3835 using 15:1 L/D capillary having 120° cone entrance angle) as a seed latex in a polymerization of a mixture of acrylic monomers comprising methyl methacrylate, ethylacrylate and glycidyl methacrylate in an 18:9:5 parts by weight ratio with the vinylidene fluoride-hexafluoropropylene copolymer to total acrylic solids being present in about a 70:30 parts by weight ratio.

The vinylidene fluoride, hexafluoropropylene copolymer latex employed as a starting material in the practice of the invention, may be prepared by a process analogous to that of U.S. Pat. No. 3,178,399. The synthesis is controlled by the art known technique of use of appropriate amounts of surfactant and/or the ratio of water to monomer to provide particles in the latex having average size less than 250 nm, preferably less than 150 nm, so that final particle size will average less than 350 nm.

The vinylidene fluoride-hexafluoropropylene copolymer latex may be precharged to a suitably sized reaction vessel equipped with a suitable stirring device, a feed inlet for addition of reactants, a suitable reflux condenser and an inlet for inert blanketing gas in combination with a free radical initiator, such as ammonium persulfate and a surfactant, such as sodium lauryl sulfate, a portion of a mixture of methyl methacrylate (18 parts by weight), ethyl acrylate (9 parts by weight) and glycidyl methacrylate (5 parts by weight) and isooctylmercaptopropionate (about 1 part by weight) is then added and stirring is commenced at a rate sufficient to mix the contents but not cause coagulation of the latex emulsion, conveniently about 90 rpm. The reactor and its contents are then purged with an inert gas, conveniently argon, for a soaking/purge period sufficient to ensure elimination of air, conveniently about 30 minutes. At the end of this time, the temperature of the reactor and its contents was raised to about 70° C. and reaction time was measured from the start of the heating period. After the reaction had continued for a time, conveniently about one hour, the remaining monomer mixture was fed, conveniently with the aid of a syringe pump at a rate sufficient to maintain the reaction but not exceed to heat exchange capacity of the reflux condenser. When all the monomer mixture had been added, the reaction was allowed to continue while maintaining 70° C. and agitation to consume unreacted monomers, for an additional period of time, conveniently about 120 minutes. The reactor is then cooled to ambient temperature, about 20° C., vented and the latex contained in the reactor filtered through cheese cloth.

If desired the pH of the filtered latex may then be adjusted to any desired convenient value with known pH adjusting agents, such as to pH 8 with ammonia water. If desired, the resin may be isolated by coagulating the latex and washing the resulting solids, after separation from the remaining liquid, with water. After drying, the solids are normally in the form of a fine powder.

One of skill in the art will understand that in addition to the specific vinylidene fluoride-hexafluoropropylene polymer latex specifically illustrated as a starting material, the invention contemplates, as equivalents, other known vinylidene fluoride hexafluoropropylene copolymers, see, for example, U.S. Pat. No. 5,093,427 and PCT Application WO 98/38242 and vinylidene fluoride homopolymers, see U.S. Pat. Nos. 3,475,396 and 3,857,827, which can be substituted as seed polymers in the afore described reaction.

The invention also contemplates as suitable seed polymers vinyl fluoride polymers of the types described in PCT Applications WO 98/46657 and WO 98/46658.

One of skill in the art will also recognize that in addition to the ethylacrylate, methyl methacrylate and glycidyl methacrylate specifically illustrated, any of the known acrylic monomers and ethylenically unsaturated monomers known to be copolymerizable with acrylic monomers may be substituted as long as one such monomer is included which contains functional groups capable of entering into crosslinking reactions. With the proviso that the major portion of the monomers must be selected from acrylic esters and methacrylic esters and at least one of the remaining selected monomers must be capable of entering into a crosslinking reaction, suitable acrylic, methacrylic and other copolymerizable monomers may be selected from among: ethylacrylate (EA), methyl acrylate (MA), butyl acrylate (BA), allyloxy propane diol (AOPD), amylacrylate, 2-ethylhexylacrylate, hexylacrylate, ethyl methacrylate (EMA), methyl methacrylate (MMA), butyl methacrylate, propyl methacrylate, isobutylmethacrylate, amyl methacrylate, 2-ethyl hexyl methacrylate, aceto acetoxy ethylmethacrylate (AEA or AAEM); of this group ethylacrylate, methylacrylate, butyl acrylate and methyl methacrylate are preferred; α,β-unsaturated carboxylic acids (acrylic acid or AA, methacrylic acid (maa or MAA), fumaric acid, crotonic acid, itaconic acid or IA), vinyl ester compounds, amide compounds (acrylamide, methacrylamide, N-alkyl methacrylamide, N-methylol methacrylamide or NMA, N-alkyl acrylamide, N-dialkyl methacrylamide, N-dialkyl acrylamide, isobutoxy methacrylamide (IBMA or iBMA)), ethylenically unsaturated monomers containing hydroxyl groups (hydroxyethyl methacrylate or HEMA, hydroxyethyl acrylate, hydroxypropyl acrylate, hydroxypropyl methacrylate, diethylene glycol ethyl acrylate or DGEA for example), monomers containing epoxy groups (glycidyl acrylate, glycidyl methacrylate or GMA, for example), monomers containing silanols (γ trimethoxysilane methacrylate, γ triethoxysilane methacrylate, trimethyl silyl propyl acrylate (TMPA or TMSPA), for example), monomers containing aldehyde functions, such as acrolein, alkenyl cyanides, such as acrylonitrile methacrylonitrile.

Some non-functional monomers may also be incorporated, such as, conjugated dienes, for example, 1,3-butadiene, isoprene, fluoro alkyl acrylates, fluoro alkyl methacrylates, aromatic alkenyl compounds, for example, styrene, '-methylstyrene, styrene halides and divinyl hydrocarbon compounds, for example, divinyl benzene.

If desired, small amounts of copolymerizable low molecular weight polymers or oligomers may also be included as may known reactive emulsifying agents. Monomers containing more than one ethylenically unsaturated functionality may be employed to create crosslinked modified fluoro resin particles. Desirably, these will be employed at less than 5% by weight of the monomer mixture. Typical examples of suitable monomers of this type are mono ethylene glycol dimethacrylate and diethylene glycol dimethacrylate.

The acrylate and/or methacrylate monomers not containing functional groups capable of entering into crosslinking reactions after polymerization, should, preferably, be 70 or greater weight percent of the total monomer mixture, and more preferably, should be above 90 weight percent. At lower proportions, compatibility with the fluoropolymer seed is decreased, transparency of the final coating or other formed object is decreased and the processability of the AMF polymer and films or other objects formed therefrom may be impaired. Similarly, one of skill in the art will be able to adjust the relative amounts of acrylic and methacrylic esters in the monomer mixture by a series of bench scale trials based on the known properties provided by each type of monomer to achieve a desired balance of the properties provided by each.

The total quantity of the copolymerizable monomers containing functional groups capable of entering into crosslinking reactions may be used in quantities of from about 0.01 to 10 parts by weight per 100 parts by weight to total monomers, preferably from about 0.01 to about 5 parts by weight.

The total quantity of monomer mixture employed may be from about 10 to about 200 parts by weight, preferably from about 20 to about 80 parts by weight, per 100 parts by weight of fluoropolymer seed.

Amounts of monomer mixture greater or lesser than the quantities specified may be employed, but properties, such as adhesion to the substrate, wetting of pigments and weathering properties, will be affected and may be reduced.

As stated above, the seed polymerization may be carried out under the same conditions as are conventionally used for conventional emulsion polymerizations of acrylic and like monomers. A surfactant, a polymerization initiator, a chain transfer agent, a pH regulator and, optionally, solvent and chelating agents are combined with the seed latex and, after purging to remove molecular oxygen, the reaction is carried out under an inert atmosphere at atmospheric pressure, from 0.5 to 6 hours at temperatures of from about 20° C. to about 90° C., preferably from about 40° C. to about 80° C.

The reaction itself, using the fluoropolymer as a seed, may be performed according to any of the standard techniques known in the art for this type of reaction, such as, batch polymerization, wherein the totality of the monomer mixture is added into the fluoropolymer dispersion at the beginning of the reaction; semi-continuous polymerization, wherein part of the monomers mixture is added at the beginning of the reaction and then the remainder is fed continuously or in batches during the course of the reaction and continuous polymerization, wherein the monomers mixture is fed continuously or in batches throughout the course of the reaction.

It is also possible to perform the emulsion polymerization in one or more stages. If multi-stages are employed, each stage may contain the same monomers, surfactant, polymerization initiator, chain transfer agent, pH regulator, optional solvent and optional chelating agent as described above for the single stage process, or one or more of the ingredients may be varied, based on known principals from the art, from state to state depending on the desired morphology of the final particles of the latex formed during the reaction. The final latex particle may be composed of one, two or more phases, in addition to the innermost fluoropolymer phase, of various geometries, such as homogeneous particle, core-shell, incomplete core-shell, inverse core-shell, half-moon, strawberry, interpenetrating network and the like. All these geometries and morphologies are well known in the art as are the techniques for preparing them. Any particular geometry and/or morphology is not contemplated as a critical limitation by the present invention, but the preferred morphology is homogeneous particle.

It is not clear exactly how the fluoropolymer phase and acrylic and optional other monomer phase are arranged in the final particle, but it is thought that the monomer mixture is mostly absorbed or adsorbed by the fluoropolymer particles and polymerized while swelling the particles.

As the emulsifier, an anionic emulsifier, a nonionic emulsifier or a combination thereof may be used. In some cases an amphoteric or cationic surfactant may be employed. As the anionic surfactant, one may employ for example, a sodium salt of a sulfuric acid ester of a higher alcohol, a sodium alkyl benzene sulfonate, a sodium salt of a dialkyl succinate sulfonic acid and a sodium salt of an alkyldiphenylether sulfonic acid. Of these, preferred are sodium alkyl benzene sulfonate, sodium lauryl sulfate, a polyoxethylene alkyl (or alkylphenyl) ether sulfonate and the like. As the nonionic emulsifier, one may employ, for example, polyoxyethylenealkyl ethers and polyoxyethylenealkyl aryl ethers. Preferred are a polyoxethylene nonylphenyl ether, polyoxethylene octylphenyl ether and the like. As the amphoteric emulsifier lauryl betaine and the like are suitable. As the cationic surfactant, one may employ, for example, an alkyl peridinium chloride, an alkyl ammonium chloride and the like. Also, emulsifiers copolymerizable with the monomers may be employed, such as, for example, sodium styrene sulfonate, sodium alkyl aryl sulfonate and the like.

The amount of surfactant or emulsifier used is normally from about 0.05 to about 5 parts by weight per 100 parts by weight of the total of the vinylidene fluoride polymer particles and the monomer mixture.

As the polymerization initiator, any known water and oil soluble free radical sources for initiation of ethylenic polymerization may be employed.

As water soluble initiators, for example, one may employ a water soluble persulfonic acid salt and hydrogen peroxide. In some cases the polymerization initiator may be employed in combination with a reducing agent. Suitable reducing agents include, for example, sodium pyrosulfite, sodium hydrogen sulfite, sodium thiosulphate, L-ascorbic acid and its salts and sodium formaldehyde sulfoxylate. Oil soluble initiators, optionally dissolved in the monomer mixture or a solvent, include organic peroxides and azo initiators. Typical examples of these compounds are 2,2'-azobisisobutronitrile, 2,2'azobis-(4-methoxy-2,4-dimethylvaleronitrile), 2,2'-azobis2,4-dimethylvaleronitrile, 1,1'-azobis-cyclohexane-1-carbo-nitrile, benzoyl peroxide, dibutyl peroxide, cumene hydroperoxide, isopropyl benzene hydroperoxide, p-methane hydroperoxide, t-butylperoxy-(2-ethyl hexanoate), succinic acid peroxide, and diacyl peroxides in general, peroxy di-carbonates and peroxymonocarbonates in general and peroxyesters in general including the t-amyl peroxyesters which have found use in assuring low residual monomer content. T-amyl hydroperoxide is also useful. Mixtures of initiators may also be used. Preferred initiators are: cumene hydroperoxide, isopropyl benzene hydroperoxide, ammonium persulfate, p-methane hydroperoxide, 2,2'-azobisisobutylonitrile, benzoyl peroxide, t-butyl hydroperoxide, 3,5,5-trimethylhexanolperoxide and t-butyl-peroxy-(2-ethyl hexanoate). The amount of the polymerization initiator used may be from about 0.1 to about 3 parts by weight of the monomer mixture.

Use of known chain transfer agents is contemplated. Such materials include, for example, halogenated hydrocarbons, such as carbon tetrachloride, chloroform, bromo form and the like, mercaptans, such as n-dodecyl mercaptan, t-dodecyl mercaptan, n-octyl mercaptan and the like, xanthogens, such as dimethylxanthogen disulfide, diisopropyl xanthogen disulfide and the like and terpenes, such as dipentene, terpinolene and the like. The amount of chain transfer agent is, preferably, from about 0 to about 10 parts by weight of the monomer mixture.

The chelating agent includes, for example, glycine, alanine, and ethylene diamine tetra acetic acid and the pH adjusting agent includes, for example, sodium carbonate, potassium carbonate and sodium hydrogen-carbonate. The amounts of chelating agent and pH adjusting agent used are from about 0 to about 0.1 part by weight and about 0 to about 3 parts by weight of the monomer mixture, respectively.

A small quantity of solvent may be added during the reaction to help swell the seed polymer. Typically, for example, these solvents may include methyl ethyl ketone, acetone, trichlorofluoroethane, methyl isobutyl ketone, dimethyl sulfoxide, toluene, dibutyl phthalate, methyl pyrrolidone, ethyl acetate and the like, in such small amounts that the operability, safety against fire hazard, environmental safety and production safety are not impaired. The amount of solvent used is from about 0 to about 20 parts by weight per 100 parts by weight of the monomer mixture.

The final acrylic modified fluoropolymer particle size has been found to affect the properties of the latex resulting from the synthesis reactions and of coatings prepared from the particles. Small particle size is preferred to obtain good film formation and good coating gloss. The particle size should range from about 50 to 400 nm with 50 to 200 nm being preferred. If the average particle diameter is less than 50nm the resulting aqueous dispersion has a high viscosity; accordingly, it is not possible to obtain high solids dispersions, and if higher shear conditions are applied, coagulation results. If the particle sizes are greater than 400 nm, poor storage stability of the latex results.

The average particle size of the acrylic modified fluoropolymers of the invention may be controlled by appropriately selecting the size of the vinylidene fluoride polymer particles.

The z-average particle diameters of the polymer particles may be determined by using a capillary hydrodynamic fractionation (CHDF) apparatus.

Additional amounts of surfactants and/or pH adjusting agents may, if desired, be added to the final latex to improve its storage stability and/or reactivity.

The acrylic modified fluoropolymer resin obtained in this invention may crosslink either through self-condensation of its functional groups or through reaction with a catalyst and/or a crosslinking agent, such as melamine resins, epoxy resins and the like, as well as known, low molecular weight crosslinkers such as di- or higher polyisocyanates, polyaziridines, polycarbodiimides, polyoxazolines, dialdehydes such as glyoxal, di- and trifunctional acetoacetates, malonates, acetals, thiols and acrylates, cycloaliphatic epoxy molecules, organosilanes such as epoxysilanes and amino silanes, carbamates, diamines, and triamines, inorganic chelating agents such as certain zinc and zirconium salts, titantes, glycourils and aother aminoplasts. In some cases, functional groups from other polymerization ingredients, such as surfactant, initiator, seed particle may be involved in the crosslinking reaction. When two or more functional groups are involved in the crosslinking process, illustrative pairs of complementary reactive groups are, for example, hydroxyl-isocyanate, acid-epoxy, amine-epoxy, hydroxyl-melamine, acetoacetate-acid. Other complementary functional groups are well known in the art and are contemplated as equivalents by this invention.

In order to obtain good film formation from the acrylic modified fluoropolymers of this invention, it is desirable that the minimum film forming temperature of said dispersion remains in the range of about 0° C. to about 70° C. This may be controlled by control of the glass transition temperature of the polymer (Tg), since the minimum film forming temperature is closely related to the Tg. The Tg of the final acrylic modified fluoropolymer can be set by appropriately selecting a seed fluoropolymer particle with an appropriate Tg and a monomer mixture providing a known Tg for the acrylic phase according to the rule generally used for compatible resin systems. See: "Emulsion Polymerization and Emulsion Polymers", Chapters 9 and 18, P. Lovell and M. ElAsser (authors), J. Wiley, Ed. 1997.

The acrylic modified fluoropolymer may be used to formulate baking or drying paint, cationic electro-deposition paint, fiber treatment agent, paper processing agent, floor coating, carpet backing, water and oil repellant treatment agents, non-adhesive treatment agent and protective surface coatings.

The acrylic modified fluoropolymer dispersions formed by the processes of the invention may be used "as is" or formulated as an aqueous emulsion-type paint by adding such typical paint additives as pigments, dispersing agents, thickeners, defoaming agents, anti-freezing agents and film forming agents. One of skill in the art will readily be able to adjust the proportions of these additives to optimize the desired properties of the paints and the films formed therefrom.

One or more water soluble resins, such as N-methyl melamine resins, alkylated-methyl melamine resins, acrylic resins, urethane resins, epoxy resins, polyester resins, nylon resins, urea resins, alkyl resins, maleinized oils and the like, and/or water dispersible resin, such as (meth)acrylic resins, vinyl acetate resins, ethylene vinyl acetate resins, urethane resins and the like, may be added when formulating paints and other coating material from the acrylic modified fluoropolymer of the invention. One of skill in the art will also be able to optimize the number of, and relative proportions of, these additives also to obtain the desired properties of the final film forming mixture and the films and like products obtained therefrom.

The acrylic modified fluoropolymer resin may also be isolated from the latex by known means, optionally, purified by known methods and formulated into such materials for forming coatings as solvent dispersions, solvent solutions, aqueous dispersions or powder coatings.

One of skill in the art will understand from the above that the resins contemplated by this invention can crosslink through self condensation (self reaction) or by the use of external crosslinking agents with or without the use of catalysts. It will also be apparent that crosslinking may occur by reaction of two different functional groups on the same molecule or on different molecules. Catalysts function in the usual way to either accelerate curing or lower the required curing temperature.

One of skill in the art will also understand that particular properties of cured resins as contemplated by the invention will be affected by a number of factors that are within the skill of the artisan to adjust such as the chemical and physical stability of crosslinks, crosslinking density, nature and amount of crosslinking agent and location of the crosslinking groups in a polymer molecule.

One of skill in the art will also readily understand how that by altering the monomer and process conditions in well known fashion, different crosslinkable systems can be prepared. Illustrative of these are: homogeneous systems where the crosslinkable groups are statistically distributed, interfacial systems where crosslinking groups are mostly on the polymer particle surface, systems where non-crosslinked particles are embedded in a matrix of crosslinked polymer and systems where crosslinked particles are embedded in a matrix of non-crosslinked polymer.

The following examples further illustrate the best mode contemplated by the inventors for the practice of the invention and are to be construed as illustrative thereof and not in limitation thereof.

GENERAL PROTOCOL

In all experiments, the seed latex, monomers from Aldrich Chemical Co. (Sigma-Aldrich) initiators, from Aldrich and DuPont, chain transfer agents, from Evans Chemetic, and surfactants, from Aldrich were used as received without further purification.

Precharge, Purge—Ammonium persulfate (1.40 g), sodium lauryl sulfate (1.5 g) and seed latex (33.4 weight percent solids, 85.8 weight percent $VF_2$, 14.2 weight percent HFP, melt viscosity 23 kp, 600 g) are precharged into a kettle equipped with a condenser, high purity argon and monomer inlets and a mechanical stirrer. In a separate vessel, a monomer mixture of methyl methacrylate (34.6 g), ethyl acrylate (14.8 g) and isooctyl mercaptopropionate (IOMP) (0.66 g) is prepared.

Soak Period—After the reactor and its initial contents were flushed and purged for 30 minutes, an initial charge of monomer mixture (12.80 g) is introduced into the reactor. The mixture is then stirred (90 rpm) for 60 minutes under argon at ambient pressure and temperature.

Reaction Period—Following the soak period, the reactor and its contents were heated to 70° C. Time ($t_o$) was taken at the start of the heating period. After 60 minutes ($t_{60}$), the remaining monomer mixture was fed using a syringe (37.26 g fed over 55 minutes). The monomer feed rate was adjusted with the aid of a syringe pump. When all monomer mixture had been added, residual monomer was consumed by maintaining the reaction temperature at 70° C. and the agitation at 90 rpm for an additional 120 minutes. The reaction mixture is then cooled to ambient temperature, vented and the latex produced by the reaction filtered through a cheese cloth. The pH of the filtered latex is then adjusted to 8 with aqueous ammonia. Polymer resin is then recovered as a fine powder by coagulation of the latex and washing the recovered solids with water and drying. The final solids content of the latex before solids recovery was 38 weight percent.

In all the following tables, the quantities of monomer(s) and seed particles are given in parts by weight.

Measurements of results of Nuclear Magnetic Resonance Spectroscopy (NMR), Thermal Gravimetric Analysis (TGA), (Differential Scanning Calorimetry (DSC), Infra Red Spectroscopy (IR), Dynamic Mechanical Analysis (DMA) and other reported results have been made by standard literature reported techniques.

Concentration of solids were determined by drying overnight in an oven at 100° C. and then under vacuum at 15 to 20 inches of Hg (50.8 to 67.7 kPa.) for one hour at 100° C. Solid content is expressed as percentages of the weight of the residue to the weight of the aqueous dispersion before drying. Glass transition temperatures (Tg) were determined using a Perkin Elmer apparatus.

The stress at yield and the strain at break values shown in the tables are an average of at least five (5) measurements made with an Instron apparatus.

Plaques of 15 mm thickness were molded from the acrylic modified fluoropolymers (recovered from the aqueous latex by coagulation using the freeze-thaw method). The plaques were baked at 360° F. to 450° F. (182° C. to 234° C.) for 2 to 5 minutes, depending on the type of seed particle used. For acrylic modified fluoropolymers prepared from a particular type of fluoropolymer seed, the baking conditions were the same, regardless of the makeup of the acrylic monomer mixture. Tensile bars meeting ASTM standards were then cut from the plaques.

The storage and loss moduli were measured with a controlled stress rheometer (DSR-200) using 25 mm parallel plate configuration. Plaques were prepared as described above, and samples of 25 mm diameter were cut. Measurements were made in the dynamic mode, under nitrogen atmosphere, at 200° C.

Solvent Resistance: Stripes were cut from plaques prepared as described above and immersed in the solvent for the time and temperature specified. The remaining material was then removed, washed with distilled water and dried under vacuum of 15 to 20 inches of Hg (50.8 to 67.7 kPa.) at 120° C. for several hours to constant weight.

Coating Evaluation: 15 g of the modified fluoropolymer powder, 20 g of isophorone, and 8 g of toluene were thoroughly mixed. As a representative pigmented paint formulation, 8 g of $TiO_2$ are added to the mixture prior to mixing. The "as prepared" formulation was drawn down on an aluminum Q-panel at 0.6 mm thickness. The panel was baked for 2 to 5 minutes at 360° F. to 540° F. (182° C. to 282° C.) depending on the seed particle type used for the modified fluoropolymer synthesis. For modified fluoropolymer prepared using the same seed particle type, the same baking conditions were applied.

The coated surfaces of the aluminum Q-panel were subjected to cross-cutting to form 100 squares of 2 mm by 2 mm each. The cross-cut portions were subjected to a peeling test using a pressure sensitive tape. The values given are the number of squares remaining after the test. Pencil hardness was determined by ASTM D3363.

Impact Test: Direct and reverse impact tests were performed in accordance with NCCA II-6, Method A, applying a 50 in. lbs. (6.78 joule) load. Cross-hatch direct and reverse impact tests were made following NCCA II-16, applying a 50 in. lbs. (5.65 joule) load. The same cross-hatch direct and reverse impact test was applied after the Q-panel had been immersed 10 minutes in a boiling water bath. The results of all tests are shown.

Gloss: The films were cast on a Leneta Form 2A opacity chart using a 0.127 meter draw down application having a 250 micrometer gap. Film gloss was determined using a Hunter Lab Progloss PG-2 gloss meter.

Methyl Ethylketone (MEK) Resistance: The coated face of the aluminum panel was rubbed using a hammer covered with a cheese cloth constantly impregnated with MEK until the coating dissolved and the aluminum surface was reached. The numbers given are the number of double rubs required to reach the aluminum surface. If the aluminum surface could not be reached, the value given is the maximum number of double rubs performed preceded by the greater ">" sign.

In all tables, unless specified otherwise, the quantities of monomer and seed particles are given in part by weight.

In the following tables, the fluoropolymer seeds employed as starting materials are identified as:

Fluoropolymer A: Vinylidene fluoride homopolymer prepared as described in U.S. Pat. No. 4,569,978, having a melt viscosity between 13.5 to 16.0 kp (ASTM D 3835 under conditions specified above) and particle size from about 100 to 350 nm.

Fluoropolymer B: copolymer synthesized as described in U.S. Pat. No. 4,569,978, having about 90% by weight vinylidene fluoride content, about 10% by weight hexafluoropropylene content, a melt viscosity of about 23 kp (ASTM D 3835 under conditions specified above) and a particle size of about 230 nm.

Fluoropolvmer C: copolymer prepared as described in U.S. Pat. No. 4,569,978 having about 88% by weight vinylidene fluoride content and about 12% by weight hexafluoropropylene content, a melt viscosity of about 23 kp (ASTM D 3835 under conditions specified above) and a particle size of about 200 nm.

Fluoropolymer D is polyvinylidene fluoride homopolymer synthesized according to U.S. Pat. No. 4,549,978 having a melt viscosity between 17 to 23 kp (ASTM D 3835 under conditions specified above) and particle size of about 90 nm.

Fluoropolvmer E is vinylidene fluoride-hexafluoropropylene copolymer having about 11% by weight hexafluoropropylene content, a melt viscosity of about 23 kp (ASTM D 3835 under conditions specified above) and a particle size of from about 100 mm to about 110 mm.

In all cases, the acrylic polymerizations were performed starting with the seed polymers identified and using the monomers specified in total amount to the amount of seed polymer and in the proportions specified to each other.

In all tables, unless specified differently, the quantities of monomer(s) and seed particles are given in parts by weight.

COMPARATIVE EXAMPLE

Modified Fluoropolymer Containing no Functional Groups Capable of Crosslinking Reactions Seed polymerizations were performed following the procedure described above.

In Table I reference polymers were prepared from homopolymer seed (fluoropolymer A) and methyl methacrylate and ethylacrylate monomers in the proportions shown.

In Table II reference polymers were prepared from the fluoropolymer seed identified for each run using methyl methacrylate and ethylacrylate monomers in the quantities specified in the Table. In Table II an azo initiator VAZO 67(Aldrich) was substituted in run 11 for the ammonium persulfate used in the other runs.

Table I illustrates adjustment of the Tg by altering the VF seed/acrylic monomer ratio and/or the methyl methacrylate-ethylacrylate ratio. Table II shows that the Tg range and consequently minimum film formation temperatures of the polymers can be greatly extended by altering the seed particle composition.

TABLE I

Synthesis of modified fluoropolymer dispersion.
Seed latex: Fluoropolymer A aqueous dispersion.
Monomer mixture: methyl methacrylate (MMA) and ethylacrylate (EA).
Dn: modified fluoropolymer particle size. Tg: glass transition temperature.

| Run # | FP* solid/acrylic monomer ratio wt # | MMA/EA ratio wt % | Solids content wt % | Dn (Nm) | Tg (° C.) |
|---|---|---|---|---|---|
| 1 | 70/30 | 80/20 | 46 | 371 | 60.3 |
| 2 | 70/30 | 70/30 | 45 | 341 | 51.2 |
| 3 | 70/30 | 60/40 | 46 | 338 | 40 |
| 4 | 70/30 | 50/50 | 46 | 360 | — |
| 5 | 80/20 | 70/30 | 42 | 315 | 50.1 |
| 6 | 70/30 | 70/30 | 51 | 350 | — |
| 7 | 60/40 | 70/30 | 49 | — | 54.6 |
| 8 | 54/46 | 70/30 | 41 | 360 | — |

*In this and subsequent tables, for the sake of compactness, FP, where used, designates fluoropolymer.

TABLE II

Synthesis of modified fluoropolymer dispersion.
Seed latex: fluoropolymer B latex or fluoropolymer C aqueous dispersion.
Monomer mixture: methyl methacrylate (MMA) and ethylacrylate (EA).
Dn: modified fluoropolymer particle size.
Tg: glass transition temperature.

| Run # | Fluoropolymer | FP solid/acrylic monomer ratio wt % | MMA/EA ratio wt # | Solids content wt % | Dn (nm) | Tg (° C.) |
|---|---|---|---|---|---|---|
| 1 | B | 70/30 | 70/30 | 48 | — | — |
| 2 | B | 61/39 | 70/30 | 42 | 373 | 14 |
| 3 | B | 68/32 | 72/28 | 48 | 345 | — |
| 4 | B | 69/31 | 73/27 | 48 | 342 | — |
| 5 | B | 71/29 | 72/28 | 46 | — | — |
| 6 | B | 94/6 | 67/33 | 43 | 300 | — |
| 7 | B | 81/19 | 69/31 | 48 | 333 | — |
| 8 | B | 81/19 | 69/31 | 48 | 334 | — |
| 9 | B | 81/19 | 69/31 | 46 | 330 | — |
| 10 | B | 80/20 | 70/30 | 46 | 346 | — |
| 11 | B | 81/19 | 70/30 | 47 | — | — |
| 12 | C | 80/20 | 70/30 | 32 | 240 | 14 |
| 13 | C | 70/30 | 75/25 | 45 | — | — |

Example I

Modified Fluoropolymer With Functional Groups.

Seed Particle=VF$_2$ Homopolymer

Table III shows the properties of a number of functional groups containing polymers synthesized in the proportions shown from the monomers shown using Fluoropolymer A as the seed polymer.

The data demonstrates that the storage modulus, $G^1(10^2Pa)$, the stress at yield, as well as the strain at break may be adjusted by properly selecting the nature and amount of functional monomer employed. For example, in experiments 1 to 3, the amount of glycidyl methacrylate (GMA) has been changed from 0.3 parts by weight to 5 parts by weight of the acrylic monomers mixture. From the change in values of the storage modulus, the stress at yield and the strain at break, it was apparent that the final, cured material becomes harder with increasing GMA content. When no functional monomer was included, Example 13, the final material was inferior in mechanical and physical properties.

From the data given in Table IV, it is evident that the solvent resistance of the modified fluoropolymer can be dramatically increased by the incorporation of crosslinkable functional group containing monomers in the acrylic monomer mixture compared to the case where none is included. For example, when extracted with triethylphosphate (TEP), the modified fluoropolymer resins containing 5% by weight HEMA or GMA retained 72 of their original weight while the sample containing no crosslinked functional groups was completely dissolved. This demonstrates that not only is the crosslinked acrylic phase rendered insoluble, but the fluoropolymer phase is also either partly or substantially completely protected from dissolution also.

Table V illustrates that when applied as an organic solvent borne coating, the modified fluoropolymer having a crosslinkable functional group in its composition is superior in hardness. Examples 13, 1 and 3 of Table V also illustrate that the resistance of the coating to methylethyl ketone (MEK) can be adjusted by varying the crosslinkable functional monomer amount. Table V shows that proper use of crosslinkable functional monomer and its proportions allows dramatic improvement in coating properties.

TABLE III

Synthesis of modified fluoropolymer dispersion.

Seed latex: Fluoropolymer A aqueous dispersion 70 parts by weight of solids. Monomer mixture composition is given in parts by weight per 100 parts of total acrylic-modified fluoropolymer particle.

| Group | 1 | 2 | 3 | 4 | 5 | 6 | 7 | 8 | 9 | 10 | 11 | 12 | 13 |
|---|---|---|---|---|---|---|---|---|---|---|---|---|---|
| MMA | 18 | 21 | 20 | 18 | 21 | 18 | 21 | 20 | 18 | 21 | 18 | 21 | 21 |
| EA | 9 | 9 | 8.5 | 7 | 9 | 7 | 9 | 8 | 7 | 9 | 7 | 9 | 9 |
| AA | — | — | — | — | | | | | 5 | 0.3 | | | |
| IA | — | — | — | — | | | | 2 | | | | | |
| HEMA | — | — | — | 5 | 0.3 | | | | | | | | |
| GMA | 5 | 0.3 | 1.5 | — | | | | | | | | | |
| NMA | — | | | | | | | | | | 5 | 0.3 | |
| TMPA | — | — | — | — | | 5 | 0.3 | | | | | | |
| Solids content (Wt %) | 47 | 44 | 46 | 47 | 48 | 43 | 47 | 40 | 42 | 46 | 46 | 44 | 50 |
| Dn (nm)[1] | 340 | 346 | 350 | 289 | — | — | 315 | 350 | 285 | — | 284 | — | 340 |
| Tg (° C.)[2] | — | 30.8 | — | — | 23 | — | 26 | — | — | 33 | — | — | 37 |
| stress @ yield (psi) | *** | 2950 | 5730 | 5900 | 4380 | 4570 | 3030 | 5650 | 7220 | 4920 | *** | 4600 | 3770 |
| strain & yield (psi) | *** | 429 | 296 | 83 | 433 | 152 | 407 | 274 | 123 | 363 | *** | 260 | 425 |
| G' ($10^2$Pa) | >800 | 100 | 200 | >800 | 200 | >500 | 150 | 40 | — | 150 | — | >600 40 | 40 |

Seed latex: Fluoropolymer A small particle size aqueous dispersion. Monomer mixture composition is given in parts by weight per 100 parts of total acrylic-modified fluoropolymer particle.

| Example # | 20 | 21 | 22 | 23 | 24 | 25 | 26 |
|---|---|---|---|---|---|---|---|
| MMA | 21 | 20.8 | 19 | 19 | 21 | 19 | 20 |
| EA | 9 | 8.5 | 9 | 8.5 | 8 | 8.5 | 9 |
| IBMA | | | | | | 2.5 | |
| MAA | | | 1 | | | | |
| HEMA | | 1.7 | | | | | |
| GMA | | | | 2.5 | | | |
| AEA | | | | | 2 | | 1 |
| DGEA | | | 2 | | | | 1 |
| Solids, wt % | 48 | 48 | 49 | 46 | 48 | 48 | 48 |
| Dn[1] (nm) | 95 | 105 | 102 | 110 | 95 | 95 | 120 |
| G' ($10^2$Pa) | 20 | 200 | 20 | 100 | 100 | >800 | |

Notes:
[1]Dn: modified fluoropolymer particle size;
[2]Tg = glass transition temperature
***to brittle to be tested

TABLE IV

SOLVENT RESISTANCE
Seed latex: Fluoropolymer A aqueous dispersion.
Monomer composition: parts by weight per 100 parts of total monomer mixture.
The remaining dried material after the test is given in parts by weight per 100 parts by weight of initial material.

| Functional Monomer (wt %) | Example # | | | | | | | | | | | | |
|---|---|---|---|---|---|---|---|---|---|---|---|---|---|
| | 13 | 10 | 6 | 7 | 8 | 5 | 3 | 2 | 1 | 15 | 12 | 18 | 19 | 4 |
| HEMA | | | | | | 0.3 | | | | | | | 5 | |
| GMA | | | | | | | 1.5 | 0.3 | 5 | 0.5 | | | | |
| IBMA | | | | | | | | | | | | 5 | | |
| NMA | | | 5 | 0.3 | | | | | | | 2.5 | | | |
| AA | | 0.3 | | | | | | | | 0.2 | 1 | | | 2 |

TABLE IV-continued

SOLVENT RESISTANCE
Seed latex: Fluoropolymer A aqueous dispersion.
Monomer composition: parts by weight per 100 parts
of total monomer mixture.
The remaining dried material after the test is given
in parts by weight per 100 parts by weight of
initial material.

| Functional Monomer (wt %) | Example # | | | | | | | | | | | | | |
|---|---|---|---|---|---|---|---|---|---|---|---|---|---|---|
| | 13 | 10 | 6 | 7 | 8 | 5 | 3 | 2 | 1 | 15 | 12 | 18 | 19 | 4 |
| IA | | | | | | 2 | | | | | | | | |
| TMPA | | | | | | | | | | | 0.3 | | | |
| THF, 80° C., 2 h. | 65 | 67 | — | 68 | 68 | 70 | — | 80 | — | 77 | 100 | — | — | — |
| NMP, 80° C., 2 h. | 0 | — | 50 | — | — | — | 0 | 0 | — | — | 95 | — | — | — |
| TEP, 100° C., 2 h. | 0 | — | — | 0 | — | — | 0 | — | 72 | — | — | 34 | 65 | 72 |

TABLE V

COATING EVALUATION
Seed latex: Fluoropolymer A aqueous dispersion.
Monomer composition: parts by weight per 100 parts of
total monomer mixture.

| Monomer | Example # | | | | | | |
|---|---|---|---|---|---|---|---|
| | 13 | 1 | 14 | 3 | 8 | 9 | 16 |
| MMA | 21 | 18 | 21 | 20 | 20 | 18 | 20 |
| EA | 9 | 9 | 8.3 | 8.5 | 8 | 7 | 9 |
| AA | — | | 0.2 | | | 5 | 0.4 |
| IA | | — | | | 2 | | |
| HEMA | | — | | | | | 0.6 |
| GMA | | 5 | 0.5 | 1.5 | | | |
| AOPD | | | | | | | |
| Solids (wt %) | 50 | 47 | 48 | 46 | 40 | 42 | 50 |
| Dn (nm)[3] | 350 | 340 | 320 | 350 | 350 | 285 | 334 |
| pencil hardness | H-F | 3H-2H | 3H-2H | 3H-2H | 3H-2H | 3H-2H | 2H-H |
| adhesion | 100 | 100 | 100 | 100 | 100 | 100 | 100 |
| Impact test[1] | P | P | P | P | P | P | P |
| MEK[2] | 400 | >1600 | 300 | 620 | 200 | 405 | 400 |

Notes:
[1]Impact Resistance: P = pass the test; F = fail the test
[2]MEK: the numbers are the numbers of double rubs.
[3]Dn: modified fluoropolymer particle size

Example II

Seed polymerization procedures analogous to that described above were performed employing Fluoropolymers B and C, as indicated in Tables VI and VII.

Table VI illustrates examples of use of functional monomers. From the change in values of the storage modulus, the stress at yield and the strain at break, it is apparent that the final aired natural properties are increased. These results show that the final properties can be adjusted by properly selecting the nature and amount of functional monomer used. When crosslinking is absent, the material is inferior in hardness and tensile strength. See example 5 where when no crosslinkable monomer is included in the acrylic monomer mixture, the mechanical properties are inferior to the examples where one was included; see examples 4,7,9 and 11.

Table VII again illustrates the effect of crosslinking of the acrylic phase on solubility of the fluoropolymer phase in contrast to where no crosslinking is possible. The results show that the insoluble portion is greater than the portion attributable to acrylic initially present, thus, indicating protection of the fluoropolymer portion from solubilization.

TABLE VI

Synthesis of modified fluoropolymer dispersion.
Seed latex: Fluoropolymer B or C aqueous dispersion.
Monomer mixture composition is given in parts by weight
per 100 parts of total monomer mixture.

| Example | 1 | 2 | 3 | 4 | 5 | 6 | 7 | 8 | 9 | 10 | 11 |
|---|---|---|---|---|---|---|---|---|---|---|---|
| Fluoropolymer | B | B | B | C | C | C | C | C | C | C | C |
| Fluoropolymer wt % | 68 | 68 | 68 | 70 | 70 | 69.7 | 69 | 70 | 70 | 71 | 71 |
| MMA | 21 | 20 | 21 | 20 | 22 | 19.5 | 17 | 18 | 18.5 | 20 | 18.5 |
| EA | 9 | 9 | 10 | 9.8 | 8 | 10 | 10 | 10.5 | 7 | 7.7 | 8 |
| AA | | | 1 | | | | | | | | |
| MAA | | | | | | 1 | | | 2 | 0.5 | 1 |
| HEMA | | | | | | | | | 2.5 | 0.8 | |
| GMA | | | | | | | 3 | | | | 1.5 |
| AEA | | 2 | | | | | | 1.5 | | | |
| IBMA | 2 | | | | | | | | | | |
| TMPA | | | | 0.2 | | | | | | | |
| Solids wt % | 47 | 48 | 42 | 42 | 45 | 41 | 43 | — | 44 | 40 | 44 |
| Tg[1] (° C.) | 9 | 8 | — | — | 8 | 6 | — | — | 14 | — | 12 |
| Dn[2] (nm) | 340 | 362 | — | — | — | 270 | — | — | 260 | — | 290 |
| stress @ yield (PSI) | 3670 | 3360 | — | 2380 | 2800 | 3000 | 1800 | — | — | 3200 | 3550 |
| stress @ break (%) | 192 | 202 | — | 232 | 450 | 480 | 430 | — | — | 430 | 60 |
| G' (10$^2$Pa) | >800 | 400 | — | >800 | 100 | 100 | 300 | 150 | 250 | 200 | 500 |

Notes:
[1]Tg: glass transition temperature
[2]Dn: modified fluoropolymer particle size

TABLE VII

SOLVENT RESISTANCE
Seed latex: Fluoropolymer B aqueous dispersion.
Monomer composition: parts by weight per 100 parts of total monomer mixture.
The remaining dried material after the test is given in parts by weight per 100 parts by weight of initial material.
Materials were treated in triethyl phosphate at room temperature for 2 hours.

| example | functional group containing monomers | functional group content weight % on final modified fluoropolymer particle | remaining material after treatment (wt %) |
|---|---|---|---|
| 5 | NONE | NONE | 0 |
| 10 | MAA/HEMA | 0.5/0.8 | 0 |
| 12 | HAA/HEMA | 0.3/1 | 0 |
| 9 | MAA/HEMA | 2/2.5 | 0 |
| 4 | TMPA | 0.2 | 68 |
| 11 | MAA/GMA | 1/1.5 | 45 |
| 6 | MAA | 1 | 0 |
| 8 | AEA | 1.5 | 22 |

Example III

Seed polymerizations were performed using fluoropolymers D and E as seed according to the procedure described above. Coating formulations were then prepared from the seed polymers so formed.

Table VIII lists the fluoropolymer seed used, the amount, in parts by weight, and identity of the acrylic (and other copolymerizable monomers, if applicable) employed in the seed polymerization, and the percent by weight total solids in the resulting seed polymer latex and the appropriate particle size of the particles in the latex. In the preparations summarized in the table, the fluoropolymer to acrylic ratio is 70 to 30 parts by weight and the acrylic monomer proportions are expressed as parts by weight on total polymer solids.

TABLE VIII

| Seed Polymer No. | Starting Fluoropolymer | Methyl Methacrylate | Ethyl Acrylate | Methacrylic Acid | Other Monomers | Total Solids (wt %) | Particle Size (nm) |
|---|---|---|---|---|---|---|---|
| III-A | D | 19 | 8 | 3 | — | 50 | 120 |
| III-B | D | 18 | 8 | 1 | hydroxyethyl methacrylate 3 | 51 | 120 |
| III-C | D | 19 | 8 | 1 | hydroxyethyl methacrylate 3 | 51 | 120 |
| III-D | D | 15 | 7 | 2 | hydroxyethyl methacrylate 6 | 50 | 120 |

TABLE VIII-continued

| Seed Polymer No. | Starting Fluoropolymer | Methyl Methacrylate | Ethyl Acrylate | Methacrylic Acid | Other Monomers | Total Solids (wt %) | Particle Size (nm) |
|---|---|---|---|---|---|---|---|
| III-E | E | 20 | 8 | — | glycidyl methacrylate 2 | 51 | 140–150 |
| III-F | E | 20 | 8 | — | acetoacetoxy ethyl methacrylate 2 | 46 | 140–150 |
| III-G | E | 20 | 8 | — | isobutyl methacrylamide 2 | 53 | 140–15 |

Table IX lists the coating formulation prepared from the seed polymers of Table VIII. In tables IX and X, the quantity of ammonia listed is of a 7% by weight solution of ammonia in water; TEXANOL® is an alcoholic ester coalescent from Eastman Chemical; ARCOSOLVE® DPM is a coalescent from Arco Chemical, except in formulation III-2 the quantity shown is of a 50:50 by weight premix in water; TRITON® X-405 is a surfactant from Union Carbide and the quantity listed in the table is as a 35% by weight solution in water; for p-toluenesulforic acid the quantity given is of a 10% by weight solution in water; BYK 346 is a wetting agent from BYK chemical company; TMP-tris-aziridine is a crosslinker from Aldrich Chemical Co. (CAS 64265-57-2) and the quantity expressed in the table is of a 50% by weight solution in propylene glycol methye ether acetate; UCARLINK® crosslinker XL-29-SE is a carbodiemide crosslinker from Union Carbide; ACRYLSOL® QR-1279W and RM-825 are associative thickeners from Rohm and Haas Company and the quantity given in the table is of 5% by weight solids in water mixtures.

TABLE IX

| | Basic Coating Formulations | | |
|---|---|---|---|
| Coating Formulation | Seed Polymer Latex | Latex quantity information (parts by weight) | Other ingredients (quantity parts by weight) |
| III-1 | III-A | 100 | ammonia (1.50) TEXANOL (5.00) |
| III-2 | III-G | 134.8 | TEXANOL (6.72) ARCOSOLVE-DPM (10.10) |
| III-3 | III-G | 100 | TRITON X-405 (6.00) ARCOSOLVE DPM (20.00) |
| III-4 | III-E | 120 | TRITON X-405 (5.00) premix of: ACRYSOL QR-1279W (12.00) and ethyleneglycol monobutylether (12.00) |
| III-5 | III-F | 200 | ARCOSOLVE DPM (40.00) |
| III-6 | III-F | 100 | TRITON X-405 (6.00) ARCOSOLVE DPM (20.00) |
| III-7 | III-F | 100 | ARCOSOLVE DPM (20.00) ACRYSOL RM 825 (1.89) BYK 346 (0.10) Ammonia (0.10) glyoxal[40 wt %](0.60 topH9.1) in water] (0.60) |
| III-8 | III-C | 170.01 | ammonia (3.36 to pH 8.3) ACRYSOL RM 825 (1.89) ethyleneglycol monobutylether (8.56) BYK 346 (0.10) |
| III-9 | III-B | 169.95 | ammonia (2.00 to pH 7.9) ACRYSOL RM 825 (1.90) premix of: ethyleneglycol monobutylether (8.49) and water (8.80) |
| III-10 | III-D | 100 | TRITON X-405 (2.00) ARCOSOLVE DPM (20.00) |
| III-11 | III-B | 140 | ARCOSOLVE DPM (28.02) ACRYSOL RM-825 (2.42) BYK 346 (0.10) |
| III-12 | III-E | 100 | ARCOSOLVE DPM (20.06) ACRYSOL RM-825 (2.19) BYK 346 (0.07) |
| III-13 | III-A | 100 | ARCOSOLVE DPM (2.66) ACRYSOL RM-825 (2.42) BYK 346 (0.07) |

In Table X, coating formulations are shown where curing/crosslinking aids were added to formulations of Table IX.

In Table X, Developing curing agent DPC-750 is a developmental diamine curing agent from Shell Resins; for adipic dihydrazide the quantity shown is for a 5% by weight in water solution; Bayhydur is Bayhydur® XP7063, a polyisocyanate curing agent from Bayer Corporation and Cymel 303 is a melamine crosslinker from Cytec Ind.

TABLE X

| FORMULATION NO. | STARTING FORMULATION NUMBER | QUANTITY IN PARTS parts by weight | Other added ingredients (parts by weight) | |
|---|---|---|---|---|
| III-14 | III-1 | 25.00 | Ucarlink crosslinker XL-29SE | (3.36) |
| III-15 | III-1 | 50.00 | TMP-trisaziridene | (2.50) |
| III-16 | III-3 | 70.00 | p-toluenesulfonic acid [10 wt % in water] | (1.00) |
| | | | BKK-346 | (0.05) |
| | | | Acrysolrm-825 | (5.00) |
| III-17 | III-4 | 35.00 | Developmental curing agent DPC-750 | (0.20) |
| III-18 | III-5 | 19.53 | Adipic dihydrazine | (1.11) |
| III-19 | III-8 | 70.00 | BAYHYDUR | (1.26) |
| III-20 | III-9 | 70.05 | BAYHYDUR | (1.77) |
| III-21 | III-10 | 80.0 | Cymel 303 | (5.00) |
| | | | BYK 346 | (0.07) |

TABLE X-continued

| FOR-MULATION NO. | STARTING FOR-MULATION NUMBER | QUANTITY IN PARTS parts by weight | Other added ingredients (parts by weight) | |
|---|---|---|---|---|
| | | | Acrysol RM-825 | (1.60) |
| III-22 | III-3 | 40.60 | III-11 | (13.25) |
| III-23 | III-12 | 75.00 | III-13 | (26.00) |

The above formulations of Tables IX and X were applied to glass (for free film studies) and chromated aluminum panels using a draw down applicator at 20 to 25 micron dry film thickness. For crosslinked or catalyzed systems the draw downs were done within several hours after addition of the crosslinker or catalyst. Panels were dried at ambient temperature (or additionally cured where indicated at a higher temperature for a short period of time). Properties were measured after at least two weeks aging.

The results are shown in Table XI.

TABLE XI

| | | | | 1 hr solvent soak** | | Free film tensile test | | |
|---|---|---|---|---|---|---|---|---|
| Formulation III | AMF Functional Group* | Crosslinker or catalyst | Curing conditions (AD = air dry) | MEK sw.ratio/sol.f ract | THF sw.ratio/ sol.fract | Strain at break, % | Toughness, psi*** | Pencil hardness on AL |
| 1 | ACID | none (control) | AD | d | d | | | F |
| 14 | 3% maa | cyarbodimide | AD | 1.7/9 | 4.0/8 | | | HB |
| 15 | 3% maa | aziridine | AD | 1.2/6 | 1.1/6 | | | H |
| | ACRYLAMIDE | | | | | | | |
| 2 | 2% iBMA | none | AD | 5.9/6.7 | 7.0/6.1 | 43 | 812 | B |
| 2 | 2% iBMA | none | 10 min @ 200° C. | 6.5/65 | 7.6/62 | 249 | 8182 | 2H |
| 3 | 2%i iBMA | none | AD | d | d | 17 | 533 | HB |
| 16 | 2% iBMA | pTSA catalyst | | 5.6/7.4 | 7.0/64 | 8 | low | 4B |
| 16 | 2% iBMA | pTSA catalyst | 30 min @ 100° C. | 4.6/28 | 5.3/17 | 14 | 314 | 2H |
| | EXPOXY | | | | | | | |
| 4 | 2% GMA | none (control) | AD | d | d | 5 | 108 | |
| 17 | 2% GMA | diamine | AD | 2.4/31 | 5.6/32 | 48 | 926 | |
| | ACETOACETATE | | | | | | | |
| 5 | 2% AAEM | none (control) | AD | d | d | 46 | 1261 | |
| 18 | 2% AAEM | dihydrazide | AD | 2.9/32 | 4.9/31 | 91 | 3100 | |
| 6 | 2% AAEM | none (control) | AD | d | d | 17 | 141 | |
| 7 | 2% AAEM | aldehyde | AD | nm/32 | nm/20 | 11 | 332 | |
| 7 | 2% AAEM | aldehyde | 30 min @ 100° C. | 6.6/53 | 6.4/42 | 22 | 683 | |
| | HYDROXY | | | | | | | |
| 8 | 1% MAA/2% HEMA | none (control) | 54 C | d | d | d | | F |
| 19 | 1% MAA/2% HEMA | isocyanate | 54 C | 3.7/20 | 4.2/21 | 4.2/21 | | 2H |
| 9 | 1% MAA/2% HEMA | none (control) | 54 C | d | d | d | | HB |
| 20 | 1% MAA/2% HEMA | isocyanate | 64 C | 2.3/2 | 3.1/5 | 3.1/5 | | 2H |
| 21 | 1% MAA/3% HEMA | melamine | AD | 2.0/7 | 3.6/10 | 3.6/10 | | 2H |
| 21 | 1% MAA/3% HEMA 1% MAA/3% HEMA 2% MAA/6% HEMA 2% MAA/6% HEMA MIXED | melamine | 30 min @ 100° C. | 2.3/0 | 2.3/2 | 2.3/2 | | 2H |
| 22 | SYSTEMS | none | AD | | | | | |
| 22 | Hydroxy + acry lamide Hydroxy + acry lamide Epoxy + Acid | none | 30 min @ 100° C. | | | | | |
| 23 | | none | 30 min @ 100° C. | | | | | | d = dissolved
nm = not measured
*Expressed as wt % functional monomer on AMF solids
**Swell ratio: Wt after 1 hr solvent soak/Wt before soak Soluble fraction: Wt after drying/Wt before soak. Lower numbers are more crosslinked.
***Toughness: Area under stress-strain curve. Pencil hardness scale: 2H > H > F > HB > B > 2B > 3B > 4B > 5B

We claim:

1. An acrylic modified fluoropolymer based on latex particles of a vinylidene fluoride polymer selected from the group consisting of vinylidene fluoride homopolymer and vinylidene fluoride-hexafluoropropylene copolymer wherein the acrylic portion of the polymer contains monomer residues having functional groups capable of entering into reactions whereby the acrylic portion becomes crosslinked with the proviso that the functional groups do not include solely carboxylic acid groups and whereby the fluoropolymer portion is protected from solubilization by known fluoropolymer solvents such as triethylphosphate and N-methylpyrrolidone.

2. An acrylic modified fluoropolymer as defined in claim 1 wherein the fluoropolymer is vinylidene fluoride hompolymer.

3. An acrylic modified fluoropolymer as defined in claim 1 wherein the vinylidene fluoride polymer is a vinylidene fluoride-hexafluoropropylene copolymer.

4. An acrylic modified fluoropolymer as defined in claim 3 wherein the acrylic portion is prepared by polymerizing methyl methacrylate, ethylacrylate and glycidyl methacrylate in the presence of a vinylidene fluoride-hexafluoropropylene copolymer seed.

5. A latex containing an acrylic modified fluoropolymer as defined in claim 1.

6. A curable composition comprising an acrylic modified fluoropolymer as defined in claim 1 and at least one crosslinking catalyst.

7. A cured composition resulting from a curable composition entering into a curing reaction where the curable composition comprises an acrylic modified fluoropolymer based on latex particles of a vinylidene fluoride polymer selected from the group consisting of vinylidene fluoride homopolymer and vinylidene fluoride-hexafluoropropylene copolymer and wherein the acrylic phase of said acrylic modified fluoropolymer contains monomer residues having functional groups whereby the acrylic phase can become crosslinked and whereby the fluoropolymer portion can be immobilized against solubilization by known fluoropolymer solvents such as triethylphosphate and N-methylpyrrolidone.

8. An acrylic modified fluoropolymer based on latex particles of a vinylidene fluoride polymer selected from the group consisting of copolymers of vinylidene fluoride with chlorotrifluoroethylene, vinyl fluoride, tetrafluoroethylene and mixtures of such comonomers as well as mixtures of such copolymers and wherein the acrylic portion of said acrylic modified copolymer contains monomer residues having functional groups capable of entering into crosslinking reactions, with the proviso that said functional groups do not include solely carboxylic acid groups.

9. An acrylic modified fluoropolymer as defined in claim 8 wherein any of the vinylidene fluoride copolymers may also include hexafluoropropylene as a comonomer.

10. A latex containing an acrylic modified fluoropolymer as defined in claim 8.

11. A latex containing an acrylic modified fluoropolymer as defined in claim 9.

12. A curable composition comprising an acrylic modified fluoropolymer as defined in claim 8 and at least one crosslinking catalyst.

13. A curable composition comprising an acrylic modified fluoropolymer as defined in claim 9 and at least one crosslinking catalyst.

14. A cured composition resulting from a curable composition entering into a curing reaction wherein the curable composition comprises an acrylic modified fluoropolymer based on latex particles of a vinylidene fluoride polymer selected from the group consisting of copolymers of vinylidene fluoride with chlorotrifluoroethylene vinylfluoride and tetrafluoroethylene mixtures of such comonomers as well as mixtures of such copolymers and wherein the acrylic modified copolymer contains monomer residues having functional groups capable of entering into crosslinking reactions with the proviso that said functional groups do not include solely carboxylic acid groups.

15. A cured composition as defined in claim 14 wherein the vinylidene fluoride copolymer may additionally contain hexafluoropropylene as a comonomer.

\* \* \* \* \*